United States Patent
Wang et al.

(10) Patent No.: US 10,000,615 B1
(45) Date of Patent: Jun. 19, 2018

(54) RETAINING COMPRESSIVE STRENGTH OF THERMOPLASTIC-TOUGHENED EPOXY COMPOSITES UNDER HOT AND WET CONDITIONS

(71) Applicant: Hexcel Corporation, Dublin, CA (US)

(72) Inventors: Yen-Seine Wang, San Ramon, CA (US); Maureen Boyle, Castro Valley, CA (US)

(73) Assignee: Hexcel Corporation, Dublin, CA (US)

(*) Notice: Subject to any disclaimer, the term of this patent is extended or adjusted under 35 U.S.C. 154(b) by 0 days. days.

(21) Appl. No.: 15/439,981

(22) Filed: Feb. 23, 2017

(51) Int. Cl.
| | |
|---|---|
| *B32B 27/00* | (2006.01) |
| *C08J 5/24* | (2006.01) |
| *C08J 5/04* | (2006.01) |
| *B32B 27/08* | (2006.01) |
| *B32B 27/38* | (2006.01) |

(52) U.S. Cl.
CPC ........... *C08J 5/24* (2013.01); *B32B 27/08* (2013.01); *C08J 5/042* (2013.01); *B32B 27/38* (2013.01); *B32B 2262/106* (2013.01); *B32B 2264/0264* (2013.01); *C08J 2363/02* (2013.01); *C08J 2463/00* (2013.01); *C08J 2463/02* (2013.01); *C08J 2477/02* (2013.01); *C08J 2481/06* (2013.01)

(58) Field of Classification Search
None
See application file for complete search history.

(56) References Cited

U.S. PATENT DOCUMENTS

| | | |
|---|---|---|
| 6,117,518 A | 9/2000 | Cawse et al. |
| 6,399,714 B1 | 6/2002 | Huang et al. |
| 7,968,179 B2 | 6/2011 | Tilbrook et al. |
| 8,846,818 B2 | 9/2014 | Wei et al. |
| 9,187,636 B2 | 11/2015 | Wang et al. |
| 2010/0304118 A1 | 12/2010 | Baidak et al. |
| 2012/0164455 A1 | 6/2012 | Griffin et al. |
| 2014/0364568 A1 | 12/2014 | Wei et al. |
| 2016/0122528 A1* | 5/2016 | Kobayashi ............ C08J 5/24 523/468 |
| 2016/0152782 A1 | 6/2016 | Cammage et al. |

* cited by examiner

*Primary Examiner* — Ana L Woodward
(74) *Attorney, Agent, or Firm* — W. Mark Bielawski; David J. Oldenkamp

(57) ABSTRACT

Pre-impregnated composite material (prepreg) is provided that can be cured/molded to form composite parts having high levels of compressive strength under dry conditions at room temperature and which retain their compressive strength when subjected to hot and wet conditions. The pre-impregnated composite materials are composed of reinforcing fibers and an uncured resin matrix. The uncured resin matrix includes a resin component made up of one or more difunctional epoxy resins and multifunctional epoxy resins. The uncured resin matrix further includes a thermoplastic particle component, a thermoplastic toughening agent and a curing agent. The thermoplastic particle component is composed of a mixture of a first group of polyamide particles that do not contain crosslinked polyamide and a second group of polyamide particles that contain crosslinked polyamide.

18 Claims, No Drawings

RETAINING COMPRESSIVE STRENGTH OF THERMOPLASTIC-TOUGHENED EPOXY COMPOSITES UNDER HOT AND WET CONDITIONS

BACKGROUND OF THE INVENTION

1. Field of the Invention

The present invention relates generally to pre-impregnated composite material (prepreg) that is used in making high performance composite parts and structures. More particularly, the invention is directed to providing prepreg that may be cured/molded to form composite parts and structures which have high compressive strength under dry conditions at room temperature and which retain most of their compressive strength when subjected to hot and wet conditions.

2. Description of Related Art

Composite materials are typically composed of a resin matrix and reinforcing fibers as the two primary constituents. Composite materials are often required to perform in demanding environments, such as in the field of aerospace where the physical limits and characteristics of the composite part or structure is of critical importance.

Pre-impregnated composite material (prepreg) is used widely in the manufacture of composite parts and structures. Prepreg is a combination that typically includes uncured resin and fiber reinforcement, which is in a form that is ready for molding and curing into the final composite part or structure. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part or structure and the distribution of resin within the fiber network affect the structural properties of the part or structure. Prepreg is a preferred material for use in manufacturing load-bearing or primary structural parts and structures. Prepreg is particularly useful in the production of aerospace primary structural parts and structures, such as wings, fuselages, bulkheads and control surfaces. It is important that these parts and structures have sufficient strength, damage tolerance and other requirements that are routinely established for such parts and structures.

The fiber reinforcements that are commonly used in aerospace prepreg are multidirectional woven fabrics or unidirectional tape that contains fibers extending parallel to each other. The fibers are typically in the form of a bundle of numerous individual fibers or filaments that is referred to as a "tow". The fibers or tows can also be chopped and randomly oriented in the resin to form a non-woven mat. These various fiber reinforcement configurations are combined with a carefully controlled amount of uncured resin. The resulting prepreg is typically placed between protective layers and rolled up for storage or transport to the manufacturing facility.

Prepreg may also be in the form of short segments of chopped unidirectional tape that are randomly oriented to form a non-woven mat of chopped unidirectional tape. This type of prepreg is referred to as a "quasi-isotropic chopped" prepreg. Quasi-isotropic chopped prepreg is similar to the more traditional non-woven fiber mat prepreg, except that short lengths of chopped unidirectional tape (chips) are randomly oriented in the mat rather than chopped fibers.

The compressive strength of a cured composite part is largely dictated by the individual properties of the reinforcing fiber and matrix resin, as well as the interaction between these two components. In addition, the fiber-resin volume ratio is an important factor. The compressive strength of a composite part is typically measured at room temperature under dry conditions. However, the compressive strength is also routinely measured after the composite part has been subjected to elevated temperature and wet conditions. Many composite parts exhibit a significant drop in compressive strength after being exposed to such hot and wet conditions.

In many aerospace applications, it is desirable that the composite part exhibit high compression strength under both room temperature/dry conditions and hot/wet conditions. However, attempts to keep compression strength constant under hotter/wetter conditions often result in negative effects on other desirable properties, such as damage tolerance and interlaminar fracture toughness.

Selecting higher modulus resins can be an effective way to increase the compression strength of a composite. However, this can result in a tendency to reduce damage tolerance, which is typically measured by a decrease in compressive properties, such as compression after impact (CAI) strength. Accordingly, it is very difficult to achieve a simultaneous increase in both the compression strength and damage tolerance.

Multiple layers of prepreg are commonly used to form composite parts that have a laminated structure. Delamination of such composite parts is an important failure mode. Delamination occurs when two layers debond from each other. Important design limiting factors include both the energy needed to initiate a delamination and the energy needed to propagate it. The initiation and growth of a delamination is often determined by examining Mode I and Mode II fracture toughness. Fracture toughness is usually measured using composite materials that have a unidirectional fiber orientation. The interlaminar fracture toughness of a composite material is quantified using the G1c (Double Cantilever Beam) and G2c (End Notch Flex) tests. In Mode I, the pre-cracked laminate failure is governed by peel forces and in Mode II the crack is propagated by shear forces.

One way to increase interlaminar fracture toughness has been to increase the ductility of the matrix resin by introducing thermoplastic sheets as interleaves between layers of prepreg. However, this approach tends to yield stiff, tack-free materials that are difficult to use. Another approach has been to include a toughened resin interlayer of about 20 to 50 microns thickness between fiber layers. The toughened resin includes thermoplastic particles. Polyamides have been used as such thermoplastic particles.

Although existing prepregs are well suited for their intended uses, there still is a continuing need to provide prepreg that may be used to make composite parts and structures that have high levels of damage tolerance (CAI), high interlaminar fracture toughness (G1c and G2c), high compressive strength under dry conditions at room temperature and which retain their compressive strength when subjected to hot and wet conditions.

SUMMARY OF THE INVENTION

In accordance with the present invention, pre-impregnated composite material (prepreg) is provided that can be molded to form composite parts that have high levels of compressive strength under dry conditions at room temperature and which retain their compressive strength when subjected to hot and wet conditions.

The pre-impregnated composite materials of the present invention are composed of reinforcing fibers and an uncured resin matrix. The uncured resin matrix includes a resin component made up of one or more difunctional epoxy resins and multifunctional epoxy resins. The uncured resin matrix further includes a thermoplastic particle component, a thermoplastic toughening agent and a curing agent. As a feature of the present invention, the thermoplastic particle component is composed of a mixture of a first group of polyamide particles that do not contain crosslinked polyamide and a second group of polyamide particles that contain crosslinked polyamide.

The present invention also covers methods for making the prepreg and methods for molding the prepreg into a wide variety of composite parts and structures. The invention also covers the composite parts and structures that are made using the improved prepreg.

It has been found that the use of an uncured resin matrix having a thermoplastic particle component that contains a first group of polyamide particles that do not contain crosslinked polyamide and a second group of polyamide particles that contain crosslinked polyamide, as set forth above, results in the formation of prepreg that may be molded to form composite parts which have high levels of compressive strength under dry conditions at room temperature and which retain their compressive strength under hot and wet conditions. These composite parts also have high levels of interlaminar fracture toughness, which is surprising since crosslinking of polyamide particles typically has a negative effect on interlaminar fracture toughness.

The above described and many other features and attendant advantages of the present invention will become better understood by reference to the following detailed description.

DETAILED DESCRIPTION OF THE INVENTION

The pre-impregnated composite materials (prepreg) of the present invention may be used as a replacement for existing prepreg that is being used to form composite parts in the aerospace industry and in any other application where high structural strength and damage tolerance is required. The invention involves substituting the resin formulations of the present invention in place of existing resins that are being used to make prepreg. Accordingly, the resin formulations of the present invention are suitable for use in any of the conventional prepreg manufacturing and curing processes.

The pre-impregnated composite materials of the present invention are composed of reinforcing fibers and an uncured resin matrix. The reinforcing fibers can be any of the conventional fiber configurations that are used in the prepreg industry. The uncured resin matrix includes a resin component that is made up of difunctional epoxy resins and multifunctional aromatic epoxy resins with a functionality greater than two. The uncured resin matrix further includes a thermoplastic particle component, a thermoplastic toughening agent and a curing agent. A feature of the present invention is that the thermoplastic particle component is composed of a mixture of a first group of polyamide particles that do not contain crosslinked polyamide and a second group of polyamide particles which do contain crosslinked polyamide.

It was discovered that thermoplastic toughened epoxy resins that include a mixture of a first group of polyamide particles that do not contain crosslinked polyamide and a second group of polyamide particles which contain crosslinked polyamide, especially when combined with certain types of carbon fibers, such as intermediate modulus carbon fibers, provide cured laminates that retain their compressive strength when subjected to hot and wet conditions and which also have unexpectedly high interlaminar fracture toughness.

The difunctional epoxy resins that are used to form the resin component of the matrix may be any suitable difunctional epoxy resin. It will be understood that this includes any suitable epoxy resin having two epoxy functional groups. The difunctional epoxy resin may be saturated, unsaturated, cycloaliphatic, alicyclic or heterocyclic. The difunctional epoxy may be used alone or in combination with multifunctional epoxy resins to form the resin component. Resin components that contain only multifunctional epoxy are also possible.

Difunctional epoxy resins, by way of example, include those based on: diglycidyl ether of Bisphenol F, Bisphenol A (optionally brominated), glycidyl ethers of phenol-aldelyde adducts, glycidyl ethers of aliphatic diols, diglycidyl ether, diethylene glycol diglycidyl ether, Epikote, Epon, aromatic epoxy resins, epoxidised olefins, brominated resins, aromatic glycidyl amines, heterocyclic glycidyl imidines and amides, glycidyl ethers, fluorinated epoxy resins, or any combination thereof. The difunctional epoxy resin is preferably selected from diglycidyl ether of Bisphenol F, diglycidyl ether of Bisphenol A, diglycidyl dihydroxy naphthalene, or any combination thereof. Most preferred is diglycidyl ether of Bisphenol F. Diglycidyl ether of Bisphenol F is available commercially from Huntsman Advanced Materials (Salt Lake City, Utah) under the trade names Araldite GY281 and GY285 and from Ciba-Geigy (Tarrytown, N.Y.) under the trade name LY9703.

The resin component includes two epoxy resins with a functionality that is greater than two. Preferred multifunctional epoxy resins are those that are trifunctional or tetrafunctional. The multifunctional epoxy resins may be saturated, unsaturated, cycloaliphatic, alicyclic or heterocyclic.

Suitable multifunctional epoxy resins, by way of example, include those based upon: phenol and cresol epoxy novolacs, glycidyl ethers of phenol-aldelyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidized olefins; brominated resins; aromatic glycidyl amines; heterocyclic glycidyl imidines and amides; glycidyl ethers; fluorinated epoxy resins or any combination thereof.

A trifunctional epoxy resin will be understood as having the three epoxy groups substituted either directly or indirectly in a para or meta orientation on the phenyl ring in the backbone of the compound. A tetrafunctional epoxy resin will be understood as having the four epoxy groups substituted either directly or indirectly in a meta or para orientation on the phenyl ring in the backbone of the compound.

The phenyl ring may additionally be substituted with other suitable non-epoxy substituent groups. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group. Suitable tetrafunctional epoxy resins include N,N,N',N'-tetraglycidyl-m-xylenediamine (available commercially from Mitsubishi Gas Chemical Company (Chiyoda-Ku, Tokyo, Japan) under the name Tetrad-X), and Erisys GA-240 (from CVC Chemicals, Morristown, N.J.). Suitable trifunctional epoxy resins, by way of example, include those based upon: phenol and cresol epoxy novolacs; glycidyl ethers of phenol-aldelyde adducts; aromatic epoxy resins; dialiphatic triglycidyl ethers; aliphatic polyglycidyl ethers; epoxidized olefins; brominated resins, aromatic glycidyl amines and glycidyl ethers; heterocyclic glycidyl imidines and amides; glycidyl ethers, fluorinated epoxy resins or any combination thereof.

A preferred exemplary trifunctional epoxy resin is triglycidyl meta-aminophenol. Triglycidyl meta-aminophenol is available commercially from Huntsman Advanced Materials (Salt Lake City, Utah) under the trade name Araldite MY0600 and from Sumitomo Chemical Co. (Osaka, Japan) under the trade name ELM-120. Another exemplary trifunctional epoxy resin is triglycidyl para-aminophenol. Triglycidyl para-aminophenol is available commercially from Huntsman Advanced Materials (Salt Lake City, Utah) under the trade name Araldite MY0510.

Examples of suitable tetrafunctional epoxy resin include, by way of example, N,N,N',N'-tetraglycidyl-4,4'-diaminodiphenyl methane (TGDDM available commercially as Araldite MY720 and MY721 from Huntsman Advanced Materials (Monthey, Switzerland), or ELM 434 from Sumitomo). Other suitable tetrafunctional epoxy resins include DEN 438 (from Dow Chemicals, Midland, Mich.), DEN 439 (from Dow Chemicals), Araldite ECN 1273 (from Huntsman Advanced Materials), and Araldite ECN 1299 (from Huntsman Advanced Materials).

The preferred resin component contains difunctional epoxy, trifunctional epoxy and tetrafunctional epoxy. In the preferred resin component, the difunctional epoxy resin is present in the range 7 wt % to 27 wt %, based on the total weight of the uncured resin matrix. Preferably, the difunctional epoxy resin is present in the range 12 wt % to 22 wt %, based on the total weight of the uncured resin matrix. More preferably, the difunctional epoxy resin is present in the range 15 wt % to 19 wt %, based on the total weight of the uncured resin matrix.

The trifunctional epoxy resin is present in the range 15 wt % to 35 wt %, based on the total weight of the uncured resin matrix. Preferably, the trifunctional epoxy resin is present in the range 20 wt % to 30 wt %, based on the total weight of the uncured resin matrix. More preferably, the trifunctional epoxy resin is present in the range 24 wt % to 28 wt %, based on the total weight of the uncured resin matrix.

The tetrafunctional epoxy resin is present in the range 5 wt % to 15 wt %, based on the total weight of the uncured resin matrix. Preferably, the tetrafunctional epoxy resin is present in the range 8 wt % to 12 wt %, based on the total weight of the uncured resin matrix. More preferably, the tetrafunctional epoxy resin is present in the range 9 wt % to 11 wt %, based on the total weight of the uncured resin matrix. Combinations of the various preferred ranges for the three types of epoxy resins in the preferred resin component are possible.

The prepreg uncured resin matrix in accordance with the present invention also includes a thermoplastic particle component that contains a first group of polyamide particles which have surfaces that do not contain crosslinked polyamide and a second group of polyamide particles that have surfaces which do contain crosslinked polyamide.

The first group of polyamide particles may be any of the polyamide particle that do not contain crosslinked polyamide and which are typically used in thermoplastic toughened epoxy-based prepreg. Such particles may be composed of polyamide (PA) 11, PA6, PA12, PA6/PA12 copolymer, PA4, PA8, PA6.6, PA4.6, PA10.10, PA6.10 and PA10.12. Non-crosslinked polyamide particles are available commercially from a number of sources. Suitable non-crosslinked polyamide 12 particles are available from Kobo Products under the trade name SP10L. SP10L particles contain over 98 wt % PA 12. The particle size distribution is from 7 microns to 13 microns with the average particle size being 10 microns. The density of the particles is 1 g/cm$^3$. It is preferred that the PA12 particles are at least 95 wt % PA12, excluding moisture content.

Other suitable non-crosslinked particles are available from Arkema (Colombes, France) under the tradenames Orgasol 1002 powder and Orgasol 3803 powder. Orgasol 1002 powder is composed of 100% PA6 particles having an average particle size of 20 microns. Orgasol 3803 is composed of particles that are a copolymer of 80% PA12 and 20% PA6 with the mean particle size being from 17 to 24 microns. Orgasol 2002 is a powder composed of non-crosslinked PA12 particles that may also be used in the first group of particles.

The preferred non-crosslinked polyamide particles for the first group of thermoplastic particles are polyamide 11 particles, which are also available commercially from a number of sources. The preferred polyamide 11 particles are available from Arkema (Colombes, France) under the trade name Rislan PA11. These particles contain over 98 wt % PA 11 and have a particle size distribution of 15 microns to 25 microns. The average particle size is 20 microns. The density of the Rislan PA11 particles is 1 g/cm$^3$. It is preferred that the PA 11 particles are at least 95 wt % PA11, excluding moisture content.

The second group of thermoplastic polyamide particles are particles that contain crosslinked polyamide on the surface of the particle, in the interior of the particle or both. The crosslinked polyamide particles may be made from polyamide that has been crosslinked prior to particle formation or non-crosslinked polyamide particles may be treated with suitable crosslinking agents to produce crosslinked polyamide particles.

Suitable crosslinked particles contain crosslinked PA11, PA6, PA12, PA6/PA12 copolymer, PA4, PA8, PA6.6, PA4.6, PA10.10, PA6.10 and PA10.12. Any of the crosslinking agents commonly used to cross link polyamide are suitable. Exemplary crosslinking agents are epoxy-based crosslinking agents, isocyanate-based crosslinking agents, carbodiimide-based crosslinking agents, acyllactam-based crosslinking agents and oxazoline-based crosslinking agent. Preferred crosslinked particles are PA12 particles that contain PA12 that has been crosslinked with an epoxy crosslinking agent. The procedures used to cross link thermoplastic polymers, including polyamide, are known. For examples, see U.S. Pat. No. 6,399,714, U.S. Pat. No. 8,846,818 and U.S. Published Patent Application US 2016/0152782 A1. The contents of these three references are hereby incorporated by reference.

Crosslinked PA12 particles are available commercially from Arkema (Colombes, France) under the tradename ORGASOL 2009 polyamide powder. The PA12 particles present in ORGASOL 2009 polyamide powder are composed of at least 40% PA12 that has been cross linked with an epoxy-based crosslinking agent. The ORGASOL 2009 crosslinked polyamide particles have an average particle size of 14.2 microns with only 0.2% of the particles having a diameter of greater than 30 microns. The melting point of ORGASOL 2009 crosslinked particles is 180° C. The specific surface area of the ORGASOL 2009 particles is 1.9 and the moisture content of the particles is 0.34%.

The crosslinked polyamide particles should each contain from 40 to 70% crosslinked polyamide. Preferably, the crosslinked polyamide particles should each contain from 40 to 60% crosslinked polyamide.

Preferably, both the non-crosslinked and crosslinked polyamide particles should have particle sizes of below 100 microns. It is preferred that the particles range in size from 5 to 60 microns and more preferably from 5 to 30 microns. It is preferred that the average particle size is from 5 to 20 microns. The particles may be regular or irregular in shape. For example, the particles may be substantially spherical or they can be particles with a jagged shape. It is preferred that the non-crosslinked particles have an average particle size that is larger than the crosslinked particles. Preferably, the average non-crosslinked particles size will range from 15 to 25 microns and the average crosslinked particle size will range from 10 to 20 microns.

The thermoplastic particle component is present in the range 5 wt % to 20 wt %, based on the total weight of the uncured resin matrix. Preferably, there will be from 5 to 15 wt % thermoplastic particles. Most preferably, the uncured resin matrix will contain from 7 to 12 wt % thermoplastic particles. The relative amounts of non-crosslinked and crosslinked particles may be varied. Preferred weight ratios of non-crosslinked particles to crosslinked particles range from 1.0:1.5 to 1.5:1.0.

The uncured resin matrix includes at least one curing agent. Suitable curing agents are those which facilitate the curing of the epoxy-functional compounds of the invention and, particularly, facilitate the ring opening polymerization of such epoxy compounds. In a particularly preferred embodiment, such curing agents include those compounds which polymerize with the epoxy-functional compound or compounds, in the ring opening polymerization thereof. Two or more such curing agents may be used in combination.

Suitable curing agents include anhydrides, particularly polycarboxylic anhydrides, such as nadic anhydride (NA), methylnadic anhydride (MNA—available from Aldrich), phthalic anhydride, tetrahydrophthalic anhydride, hexahydrophthalic anhydride (HHPA—available from Anhydrides and Chemicals Inc., Newark, N.J.), methyltetrahydrophthalic anhydride (MTHPA—available from Anhydrides and Chemicals Inc.), methylhexahydrophthalic anhydride (MHHPA—available from Anhydrides and Chemicals Inc.), endomethylenetetrahydrophthalic anhydride, hexachloroendomethylene-tetrahydrophthalic anhydride (Chlorentic Anhydride—available from Velsicol Chemical Corporation, Rosemont, Ill.), trimellitic anhydride, pyromellitic dianhydride, maleic anhydride (MA—available from Aldrich), succinic anhydride (SA), nonenylsuccinic anhydride, dodecenylsuccinic anhydride (DDSA—available from Anhydrides and Chemicals Inc.), polysebacic polyanhydride, and polyazelaic polyanhydride.

Further suitable curing agents are the amines, including aromatic amines, e.g., 1,3-diaminobenzene, 1,4-diaminobenzene, 4,4'-diamino-diphenylmethane, and the polyaminosulphones, such as 4,4'-diaminodiphenyl sulphone (4,4'-DDS—available from Huntsman), 4-aminophenyl sulphone, and 3,3'-diaminodiphenyl sulphone (3,3'-DDS). Also, suitable curing agents may include polyols, such as ethylene glycol (EG—available from Aldrich), poly (propylene glycol), and poly(vinyl alcohol); and the phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400, these being available as HRJ 2210, HRJ-2255, and SP-1068, respectively, from Schenectady Chemicals, Inc., Schenectady, N.Y.). Further as to phenol-formaldehyde resins, a combination of CTU guanamine, and phenol-formaldehyde resin having a molecular weight of 398, which is commercially available as CG-125 from Ajinomoto USA Inc. (Teaneck, N.J.), is also suitable.

Different commercially available compositions may be used as curing agents in the present invention. One such composition is AH-154, a dicyandiamide type formulation, available from Ajinomoto USA Inc. Others which are suitable include Ancamide 400, which is a mixture of polyamide, diethyltriamine, and triethylenetetraamine, Ancamide 506, which is a mixture of amidoamine, imidazoline, and tetraethylenepentaamine, and Ancamide 1284, which is a mixture of 4,4'-methylenedianiline and 1,3-benzenediamine; these formulations are available from Pacific Anchor Chemical, Performance Chemical Division, Air Products and Chemicals, Inc., Allentown, Pa.

Additional suitable curing agents include imidazole (1, 3-diaza-2, 4-cyclopentadiene) available from Sigma Aldrich (St. Louis, Mo.), 2-ethyl-4-methylimidazole available from Sigma Aldrich, and boron trifluoride amine complexes, such as Anchor 1170, available from Air Products & Chemicals. Inc.

Still additional suitable curing agents include 3,9-bis(3-aminopropyl-2,4,8,10-tetroxaspiro[5.5]undecane, which is commercially available as ATU, from Ajinomoto USA Inc., as well as aliphatic dihydrazide, which is commercially available as Ajicure UDH, also from Ajinomoto USA Inc., and mercapto-terminated polysulphide, which is commercially available as LP540, from Morton International, Inc., Chicago, Ill.

The curing agent(s) is selected so that it provides curing of the matrix at suitable temperatures. The amount of curing agent required to provide adequate curing of the matrix will vary depending upon a number of factors including the type of resin being cured, the desired curing temperature and curing time. Curing agents typically may also include cyanoguanidine, aromatic and aliphatic amines, acid anhydrides, Lewis Acids, substituted ureas, imidazoles and hydrazines. The particular amount of curing agent required for each particular situation may be determined by well-established routine experimentation.

Exemplary preferred curing agents include 4,4'-diaminodiphenyl sulphone (4,4'-DDS) and 3,3'-diaminodiphenyl sulphone (3,3'-DDS), both commercially available from Huntsman.

The curing agent is present in an amount that ranges from 10 wt % to 30 wt % of the uncured resin matrix. Preferably, the curing agent is present in an amount that ranges from 15 wt % to 25 wt %. More preferably, the curing agent is present in the range 18 wt % to 24 wt % of the uncured resin matrix.

4,4'-DDS is a particularly preferred curing agent. It is preferably used as the sole curing agent in an amount ranging from 19 wt % to 23 wt %. Small amounts (less than 2 wt %) of other curatives, such as 3,3'-DDS, may be included, if desired.

The uncured resin matrix of the present invention also includes a thermoplastic toughening agent. Any suitable thermoplastic polymers may be used as the toughening agent. Typically, the thermoplastic polymer is added to the resin mix as particles that are dissolved in the resin mixture by heating prior to addition of the curing agent. Once the thermoplastic agent is substantially dissolved in the hot matrix resin precursor (i.e. the blend of epoxy resins), the precursor is cooled and the remaining ingredients (curing agent and insoluble thermoplastic particles) are added.

Exemplary thermoplastic toughening agents/particles include any of the following thermoplastics, either alone or in combination: polysulfone, polyethersulfone, high performance hydrocarbon polymers, elastomers, and segmented elastomers.

The toughening agent is present in the range 5 wt % to 26 wt %, based on the total weight of the uncured resin matrix. Preferably, the toughening agent is present in the range 8 wt % to 23 wt %. More preferably, the toughening agent is present in the range 13 wt % to 18 wt %. A suitable toughening agent, by way of example, is particulate polyethersulfone (PES) sold under the trade name Sumikaexcel 5003P, which is commercially available from Sumitomo Chemicals. Alternatives to 5003P are Solvay polyethersulphone 105RP, or the non-hydroxyl terminated grades such as Solvay 1054P. Densified PES particles may be used as the toughening agent. The form of the PES is not particularly important since the PES is dissolved during formation of the resin. Densified PES particles can be made in accordance with the teachings of U.S. Pat. No. 4,945,154, the contents of which are hereby incorporated by reference. Densified PES particles are also available commercially from Hexcel Corporation (Dublin, Calif.) under the trade name HRI-1. The average particle size of the toughening agent should be less than 100 microns to promote and insure complete dissolution of the PES in the matrix.

The uncured resin matrix may also include additional ingredients, such as performance enhancing or modifying agents and additional thermoplastic polymers provided they do not adversely affect the tack and out life of the prepreg or the strength and damage tolerance of the cured composite part. The performance enhancing or modifying agents, for example, may be selected from flexibilizers, non-particulate toughening agents, accelerators, core shell rubbers, flame retardants, wetting agents, pigments/dyes, UV absorbers, anti-fungal compounds, fillers, conducting particles, and viscosity modifiers.

Suitable accelerators are any of the urone compounds that have been commonly used. Specific examples of accelerators, which may be used alone or in combination, include N,N-dimethyl, N'-3,4-dichlorphenyl urea (Diuron), N'-3-chlorophenyl urea (Monuron), and preferably N,N-(4-methyl-m-phenylene bis[N',N'-dimethylurea] (e.g. Dyhard UR500 available from Degussa).

Suitable fillers include, by way of example, any of the following either alone or in combination: silicas, aluminas, titania, glass, calcium carbonate and calcium oxide.

Suitable conducting particles, by way of example, include any of the following either alone or in combination: silver, gold, copper, aluminum, nickel, conducting grades of carbon, buckminsterfullerene, carbon nanotubes and carbon nanofibres. Metal-coated fillers may also be used, for example nickel coated carbon particles and silver coated copper particles.

The uncured resin matrix may include small amounts (less than 5 wt %) of an additional non-epoxy thermosetting polymeric resin. Once cured, a thermoset resin is not suitable for melting and remolding. Suitable non-epoxy thermoset resin materials for the present invention include, but are not limited to, resins of phenol formaldehyde, urea-formaldehyde, 1,3,5-triazine-2,4,6-triamine (Melamine), bismaleimide, vinyl ester resins, benzoxazine resins, phenolic resins, polyesters, cyanate ester resins, epoxide polymers, or any combination thereof. The thermoset resin is preferably selected from epoxide resins, cyanate ester resins, benzoxazine and phenolic resins. If desired, the matrix may include further suitable resins containing phenolic groups, such as resorcinol based resins, and resins formed by cationic polymerization, such as DCPD—phenol copolymers. Still additional suitable resins are melamine-formaldehyde resins, and urea-formaldehyde resins.

The uncured resin matrix is made in accordance with standard prepreg matrix processing. In general, the various epoxy resins are mixed together at room temperature to form a resin mix to which the thermoplastic toughening agent is added. This mixture is then heated to about 120° C. for about 1 to 2 hours to dissolve the thermoplastic toughening agent. The mixture is then cooled down to about 80° C. and the remainder of the ingredients (thermoplastic particle component, curing agent and other additive, if any) is mixed into the resin to form the final matrix resin that is impregnated into the fiber reinforcement.

The uncured matrix resin is applied to the fibrous reinforcement in accordance with any of the known prepreg manufacturing techniques. The fibrous reinforcement may be fully or partially impregnated with the matrix resin. In an alternate embodiment, the matrix resin may be applied to the fiber fibrous reinforcement as a separate layer, which is proximal to, and in contact with, the fibrous reinforcement, but does not substantially impregnate the fibrous reinforcement. The prepreg is typically covered on both sides with a protective film and rolled up for storage and shipment at temperatures that are typically kept well below room temperature to avoid premature curing. Any of the other prepreg manufacturing processes and storage/shipping systems may be used if desired.

The fibrous reinforcement of the prepreg may be selected from hybrid or mixed fiber systems that comprise synthetic or natural fibers, or a combination thereof. The fibrous reinforcement may preferably be selected from any suitable material such as fiberglass, carbon or aramid (aromatic polyamide) fibers. The fibrous reinforcement is preferably carbon fibers. Preferred carbon fibers are in the form of tows that contain from 3,000 to 15,000 carbon filaments (3K to 15K). Commercially available carbon fiber tows that contain 6,000 or 12,000 carbon filaments (6K or 12K) are preferred.

The uncured matrix resins of the present invention are particularly effective in providing laminates that retain their compression strength under hot and wet conditions when the carbon tow contains from 10,000 to 14,000 filaments, the tensile strength is from 750 to 860 ksi, the tensile modulus is from 35 to 45 Msi, the strain at failure is 1.5 to 2.5%, the density is 1.6 to 2.0 g/cm$^3$ and the weight per length is from 0.2 to 0.6 g/m. 6K and 12K IM7 carbon tows (available from Hexcel Corporation) are preferred. IM7 12K fibers have a tensile strength of 820 ksi, the tensile modulus is 40 Msi, the strain at failure is 1.9%, the density is 1.78 g/cm$^3$ and the weight per length is 0.45 g/m. IM7 6K fibers have a tensile strength of 800 ksi, the tensile modulus is 40 Msi, the strain at failure is 1.9%, the density is 1.78 g/cm$^3$ and the weight per length is 0.22 g/m. IM7 fibers and carbon fibers with similar properties are generally considered to be intermediate modulus carbon fibers.

The fibrous reinforcement may comprise cracked (i.e. stretch-broken) or selectively discontinuous fibers, or continuous fibers. It is envisaged that use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Villeurbanne, France).

The prepreg may be in the form of continuous tapes, towpregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

An exemplary preferred uncured matrix resin includes from 15 wt % to 19 wt % Bisphenol-F diglycidyl ether (GY285); from 24 wt % to 28 wt % triglycidyl-m-aminophenol (MY0600); from 8 wt % to 13 wt % tetrafunctional epoxy (MY721); from 13 wt % to 18 wt % polyethersulfone (5003P) as a toughening agent; from 2 wt % to 7 wt % crosslinked polyamide 12 particles (ORGASOL 2009); from 2 wt % to 7 wt % polyamide 11 particles (Rislan PA11) where the weight ratio of crosslinked polyamide 12 particles to polyamide 11 particles is from 1.4:1.0 to 1.0:1.4; and from 18 wt % to 23 wt % 4,4'-DDS as the curing agent.

The prepreg may be molded using any of the standard techniques used to form composite parts. Typically, one or more layers of prepreg are place in a suitable mold and cured to form the final composite part. The prepreg of the invention may be fully or partially cured using any suitable temperature, pressure, and time conditions known in the art. Typically, the prepreg will be cured in an autoclave at temperatures of between 160° C. and 190° C. The composite material may be cured using a method selected from microwave radiation, electron beam, gamma radiation, or other suitable thermal or non-thermal radiation.

Composite parts made from the prepreg of the present invention will find application in making articles such as numerous primary and secondary aerospace structures (wings, fuselages, bulkheads and the like), but will also be useful in many other high performance composite applications including automotive, rail and marine applications where high compressive strengths are needed both under dry conditions at room temperature and under hot and wet conditions.

In order that the present invention may be more readily understood, reference will now be made to the following information and examples of the invention.

EXAMPLE 1

A preferred exemplary resin formulation in accordance with the present invention is set forth in TABLE 1. An uncured matrix resin was prepared by mixing the epoxy ingredients at room temperature with the polyethersulfone to form a resin blend that was heated to 120° C. for 60 minutes to completely dissolve the polyethersulfone. The mixture was cooled to 80° C. and the rest of the ingredients were added and mixed in thoroughly.

TABLE 1

| Ingredient | Amount (Wt %) |
| --- | --- |
| Bisphenol-F diglycidyl ether (GY285) | 17.30 |
| Trifunctional meta-glycidyl amine (MY0600) | 26.15 |
| N,N,N',N'-tetraglycidyl-4,4'-diaminodiphenyl methane (MY721) | 10.46 |

TABLE 1-continued

| Ingredient | Amount (Wt %) |
| --- | --- |
| Thermoplastic Toughening Agent (polyether sulfone - 5003P) | 15.69 |
| Crosslinked PA12 Particles (ORGASOL 2009) | 4.75 |
| Non-crosslinked - PA11 Particles (Rislan 11) | 4.75 |
| Aromatic diamine curing agent (4,4'-DDS) | 20.90 |

Exemplary prepreg was prepared by impregnating a layer of unidirectional carbon fibers with the resin formulation of TABLE 1 to form a prepreg composed of reinforcing fibers and an uncured resin matrix. The unidirectional carbon fibers were 12K IM7 available from Hexcel Corporation. The uncured resin matrix amounted to 35 weight percent of the total uncured prepreg weight and the fiber areal weight of the uncured prepreg was 145 grams per square meter (gsm).

The prepreg was used to form a laminate made up of 6 layers of prepreg in which all of the unidirectional fibers were oriented in the same direction, which is denoted as the 0° direction or 0° orientation. The laminate was cured in an autoclave at 177° C. for about 2 hours to form a cured test laminate. The cured test laminate was examined to determine its compressive strength in the 0° direction (referred to herein as "0° compressive strength") in accordance with ASTM D695-10, which was published in April, 2010 (DOI: 10.1520/D0695-10) and which is available from ASTM International. The contents of ASTM D695-10 are hereby incorporated by reference.

The 0° compressive strength of one cured test laminate was examined under dry conditions (relative humidity of 10% to 50%) at room temperature (21 to 24° C.) without any prior conditioning of the laminate The compressive strength measured using this test procedure is referred to herein as the "0° compressive strength under dry conditions at room temperature".

Another cured test laminate was conditioned for 14 days in deionized water at 71° C. prior to testing for 0° compressive strength according to ASTM D695-10. The compressive strength measured using this test procedure is referred to herein as the "0° compressive strength under hot and wet conditions".

The 0° Compressive strength under dry conditions at room temperature for the cured test laminate of Example 1 was 263 kilopounds per square inch (ksi) and the 0° Compressive strength under hot and wet conditions was 204 ksi. The 0° compressive strength of cured test laminate under hot and wet conditions is 77.6% of the 0° compressive strength under dry conditions at room temperature. This 77.6% retention of 0° compressive strength under hot and wet conditions is substantially above the retention levels for existing thermoplastic toughed epoxy resins, which typically only retain 50% to 60% of their 0° compressive strength under hot and wet conditions, especially when combined with an intermediate modulus carbon fiber, such as IM7.

Cured test laminates were also subjected to standard tests to determine their tolerance to damage (CAI) and interlaminar fracture toughness (G1c and G2c). Compression after Impact (CAI) was determined using a 270 in-lb impact against a 32-ply quasi-isotropic laminate. The specimens were machined, impacted and tested in accordance with Boeing test method BSS7260 per BMS 8-276. Values are normalized to a nominal cured laminate thickness of 0.18 inches.

G1c and G2c are standard tests that provide a measure of the interlaminar fracture toughness of the cured laminate.

G1c and G2c were determined in accordance with ASTM D5528. Both G1c and G2c samples were machined from the same cured test laminate. The CAI of the cured test laminate was 52.8 ksi with G1c and G2c being 3.2 in-lb/in$^2$ and 12.8 in-lb/in$^2$, respectively.

Other examples of the invention include prepreg made with a resin formulation, as set forth in TABLE 1, where minor changes in the total and relative amounts of the various ingredients are made provided that the 0° compressive strength under dry conditions at room temperature of the resulting cured test laminate remains between 250 and 350 ksi and the 0° compressive strength of the cured test laminate under hot and wet conditions is at least 75% of the 0° compressive strength under dry conditions at room temperature.

The following is an example of the range of matrix resin formulations that would be expected to meet the above requirements regarding 0° compressive strength under dry conditions at room temperature (250-350 ksi) and retention of 0° compressive strength under hot and wet conditions (at least 75%). The exemplary range of uncured matrix resin formulations include those having: from 15 wt % to 19 wt % Bisphenol-F diglycidyl ether (GY285); from 24 wt % to 28 wt % triglycidyl-m-aminophenol (MY0600); from 8 wt % to 13 wt % tetrafunctional epoxy (MY721); from 13 wt % to 18 wt % polyethersulfone (5003P) as a toughening agent; from 2 wt % to 7 wt % crosslinked polyamide 12 particles (ORGASOL 2009); from 2 wt % to 7 wt % polyamide 11 particles (Rislan PA11) where the weight ratio of crosslinked polyamide 12 particles to polyamide 11 particles is from 1.4:1.0 to 1.0:1.4; and from 18 wt % to 23 wt % 4,4'-DDS as the curing agent.

Exemplary matrix resin formulations that fall within the above ranges can be combined with an intermediate modulus carbon fiber, such as IM7, to form prepreg that can be used to form uncured laminates in accordance with the present invention. To verify that each exemplary matrix resin meets the requirements of the present invention, it is necessary to test each laminate to confirm that it has a 0° compressive strength under dry conditions at room temperature of between 250-350 ksi and that it retains at least 75% of its compressive strength under hot and wet conditions.

COMPARATIVE EXAMPLE 1

A comparative prepreg was prepared and used to from a test laminate that was cured in the same manner as Example 1. The comparative matrix formulation contained polyamide particles that are available commercially from Arkema (France) under the trade names Orgasol 1002 and Orgasol 3803. The prepreg was prepared using the same IM7 carbon fiber as Example 1. The prepreg contained 35% resin by weight and had a fiber areal weight of 145 gsm. The formulation used for the comparative prepreg is set forth in TABLE 2.

TABLE 2

| Ingredient | Amount (wt %) |
|---|---|
| Bispheno-F diglycidyl ether (GY285) | 17.3 |
| Trifunctional meta-glycidyl amine (MY0600) | 26.2 |
| N,N,N',N'-tetraglycidyl-4,4'-diaminodiphenyl methane (MY721) | 10.5 |
| PES (5003P) | 15.7 |
| 4,4-DDS | 20.9 |
| Polyamide 12 Particles (Orgasol 1002) | 4.75 |

TABLE 2-continued

| Ingredient | Amount (wt %) |
|---|---|
| Polyamide 12 Particles (Orgasol 3803) | 4.75 |

The cured comparative test laminate was tested in the same manner as Example 1. The 0° compressive strength under dry conditions at room temperature was 269 and the 0° compressive strength under hot and wet conditions was 160 which is a retention of 0° compressive strength under hot and wet conditions of 59.5/%. This retention level is representative of cured laminates composed of medium modulus carbon fibers and thermoplastic toughened epoxy resin. The CAI was 55.6 ksi. The G1c and G2c were 2.5 in-lb/in$^2$ and 12.7 in-lb/in$^2$, respectively.

COMPARATIVE EXAMPLE 2

A second comparative prepreg was prepared and used to form a cured test laminate in the same manner as Example 1. The formulation of the matrix resin used for the comparative prepreg is set forth in TABLE 3. The prepreg was prepared using the same IM7 carbon fiber as Example 1. The prepreg contained 35% resin by weight and had a fiber areal weight of 145 gsm.

TABLE 3

| Ingredient | Amount (Wt %) |
|---|---|
| Bisphenol-F diglycidyl ether (GY285) | 17.01 |
| Trifunctional meta-glycidyl amine (MY0600) | 25.72 |
| N,N,N',N'-tetraglycidyl-4,4'-diaminodiphenyl methane (MY721) | 10.29 |
| Thermoplastic Toughening Agent (polyether sulfone - 5003P) | 15.43 |
| PA12 Particles (SP10L) | 6.25 |
| PA11 Particles (Rislan 11) | 4.75 |
| Aromatic diamine curing agent (3,3'-DDS) | 20.55 |

The 0° compressive strength under dry conditions at room temperature was 293 and the 0° compressive strength under hot and wet conditions was 188 which is a retention of 0° compressive strength under hot and wet conditions of 64.2%. The CAI was 54.7 ksi. The G1c and G2c were 3.5 in-lb/in$^2$ and 13.0 in-lb/in$^2$, respectively.

The resin formulation used in Example 1 is the same as Comparative Example 2, except that 4,4'-DDS is used in place of 3,3'-DDS as the curing agent and surface crosslinked PA12 particles (4.75 wt % ORGASOL 2009) are used in place of non-crosslinked PA12 particles (6.25 wt % SP10L).

Based on prior testing of other similar thermoplastic toughened epoxy resins, the change, if any, in the retention of 0° compressive strength under hot and wet conditions caused by using 4,4'-DDS in place of 3,3'-DDS would be only a maximum of a few percent at most. Also based on prior testing of similar thermoplastic toughened epoxy resins, the change in the retention of 0° compressive strength under hot and wet conditions, if any, resulting from using a slightly higher amount of PA12 particles (6.25 wt % versus 4.75 wt %) would also be only a maximum of a few percent. Accordingly, the increase in retention of 0° compressive strength under hot and wet conditions of 13.4% (64.2% up to 77.6%) observed in Example 1 is believed to be substantially due to substituting crosslinked PA12 particles (ORGASOL 2009) for non-crosslinked PA12 particles (SP10L).

In conducting Example 1, it was expected that substituting crosslinked PA12 particles for non-crosslinked PA12 particles would not affect retention of 0° compressive strength any more than the above described two changes to the resin formulation of Comparative Example 2. Accordingly, the observed substantial increase in retention of 0° compressive strength under hot and wet conditions in Example 1, as compared to Comparative Example 2, was unexpected.

In addition, based on prior testing of other similar thermoplastic toughened epoxy resins, it was expected that crosslinking of the non-crosslinked PA12 particles could have a negative effect on CAI, G1c and G2c. Accordingly, it was unexpected that the CAI of 52.8 ksi for Example 1 was only 1.9 ksi below the CAI of Comparative Example 2. Further, it was unexpected that the G1c and G2c of Example 1 were only 0.3 in-lb/in$^2$ and 0.2 in-lb/in$^2$, respectively, lower than Comparative Example 2.

The above unexpected results make the resin formulations of the present invention particularly useful, when combined with intermediate modulus carbon fibers, for producing composite parts and structures that retain their compressive strength under hot and wet conditions while at the same time maintaining the high damage tolerance (CAI) and high interlaminar fracture toughness (G1c and G2c) which are obtained when the polyamide particle component of the resin is a combination of non-crosslinked PA12 and non-crosslinked PA11.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A pre-impregnated composite material that is curable to form a composite part which has a 0° compressive strength under dry conditions at room temperature of between 250 and 350 kilopounds per square inch and wherein the 0° compressive strength of said composite part under hot and wet conditions is at least 75% of said 0° compressive strength under dry conditions at room temperature, said pre-impregnated composite material comprising:
   A) reinforcing fibers; and
   B) an uncured resin matrix comprising:
      a) a resin component comprising at least one epoxy resin;
      b) a thermoplastic particle component comprising a mixture of a first group of polyamide particles that do not comprise crosslinked polyamide and a second group of polyamide particles that comprise crosslinked polyamide;
      c) a thermoplastic toughening agent comprising polyethersulfone; and
      d) a curing agent.

2. A pre-impregnated composite material according to claim 1 wherein said resin component comprises a difunctional epoxy resin which comprises two epoxy functional groups, a trifunctional epoxy resin which comprises three epoxy functional groups and a tetrafunctional epoxy resin which comprises four epoxy functional groups.

3. A pre-impregnated composite material according to claim 2 wherein said difunctional epoxy resin is selected from the group consisting of diglycidyl ether of bisphenol F, diglycidyl ether of bisphenol A, diglycidyl dihydroxy naphthalene and combinations thereof.

4. A pre-impregnated composite material according to claim 3 wherein said trifunctional epoxy is a trifunctional meta-glycidyl amine and said tetrafunctional epoxy is a tetrafunctional para-glycidyl amine.

5. A pre-impregnated composite material according to claim 1 wherein said reinforcing fibers are carbon fibers.

6. A pre-impregnated composite material according to claim 5 wherein said reinforcing fibers comprise a carbon fiber tow which comprises from 10,000 to 14,000 carbon filaments wherein the weight per length of said carbon tow is from 0.2 to 0.6 grams per meter and wherein the tensile strength of the carbon tow is from 750 to 860 kilopounds per square inch and the tensile modulus of the carbon tow is from 35 to 45 megapounds per square inch.

7. A pre-impregnated composite material according to claim 1 wherein said first group of polyamide particles comprise polyamide 11 particles and said second group of particles comprise crosslinked polyamide 12 particles that comprise crosslinked polyamide 12.

8. A pre-impregnated composite material according to claim 7 wherein the amount of said polyamide 11 particles is equal to the amount of said crosslinked polyamide 12 particles.

9. A pre-impregnated composite material according to claim 1 wherein said curing agent is an aromatic amine.

10. A pre-impregnated composite material according to claim 9 wherein said aromatic amine is 4,4'-diaminodiphenyl sulphone.

11. A composite part or structure that has been formed by curing a pre-impregnated composite material according to claim 1, said composite part having a 0° compressive strength under dry conditions at room temperature of between 250 and 350 kilopounds per square inch and wherein the 0° compressive strength of said composite part under hot and wet conditions is at least 75% of said 0° compressive strength under dry conditions at room temperature.

12. A composite part or structure according to claim 11 wherein said composite part or structure forms at least part of an aircraft primary structure.

13. A method for making a composite part or structure comprising the steps of providing a pre-impregnated composite material according to claim 1 and curing said pre-impregnated composite material.

14. A method for making a pre-impregnated composite material that is curable to form a composite part that is curable to form a composite part which has a 0° compressive strength at room temperature of between 250 and 300 kilopounds per square inch and wherein the 0° compressive strength of said composite part under hot/wet conditions is at least 75% of said of said 0° compressive strength at room temperature, said method comprising the steps of:
   A) providing reinforcing fibers; and
   B) impregnating said reinforcing fibers with an uncured resin matrix wherein said uncured resin matrix comprises:
      a) a resin component comprising at least one epoxy resin;
      b) a thermoplastic particle component comprising a mixture of a first group of polyamide particles that do not comprise crosslinked polyamide and a second group of polyamide particles that have surfaces which comprise crosslinked polyamide;
      c) a thermoplastic toughening agent comprising polyethersulfone; and
      d) a curing agent.

15. A method for making a pre-impregnated composite material according to claim 14 wherein said resin component comprises a difunctional epoxy resin which comprises two epoxy functional groups, a trifunctional epoxy resin which comprises three epoxy functional groups and a tetra-functional epoxy resin which comprises four epoxy functional groups.

16. A method for making a pre-impregnated composite material according to claim 15 wherein said difunctional epoxy resin is selected from the group consisting of diglycidyl ether of bisphenol F, diglycidyl ether of bisphenol A, diglycidyl dihydroxy naphthalene and said trifunctional epoxy is a trifunctional meta-glycidyl amine and said tetrafunctional epoxy is a tetrafunctional para-glycidyl amine.

17. A method for making a pre-impregnated composite material according to claim 14 wherein said first group of polyamide particles comprise polyamide 11 particles and said second group of particles comprise crosslinked polyamide 12 particles that comprise crosslinked polyamide.

18. A method for making a pre-impregnated composite material according to claim 14 wherein said reinforcing fibers are carbon fibers.

* * * * *